(12) United States Patent
Tesla

(10) Patent No.: US 12,158,397 B1
(45) Date of Patent: Dec. 3, 2024

(54) SYSTEMS AND METHODS FOR CONDITIONAL TIME NEAR AMBIENT MONITORING AND DETECTION OF LEAKS

(71) Applicant: Tesla Subsea Inc., Katy, TX (US)

(72) Inventor: Marlon J. Tesla, Katy, TX (US)

(73) Assignee: Tesla Subsea Inc., Katy, TX (US)

( * ) Notice: Subject to any disclaimer, the term of this patent is extended or adjusted under 35 U.S.C. 154(b) by 0 days.

(21) Appl. No.: 18/751,025

(22) Filed: Jun. 21, 2024

(51) Int. Cl.
G01M 3/26 (2006.01)
E21B 47/117 (2012.01)

(52) U.S. Cl.
CPC ............. *G01M 3/26* (2013.01); *E21B 47/117* (2020.05)

(58) Field of Classification Search
CPC ................................ G01M 3/26; E21B 47/117
See application file for complete search history.

(56) References Cited

U.S. PATENT DOCUMENTS

| 4,796,466 | A | * | 1/1989 | Farmer | G01M 3/2807 73/49.1 |
| 9,322,735 | B1 | * | 4/2016 | Tan | G01W 1/00 |
| 2020/0271808 | A1 | * | 8/2020 | Jagannathan | G01V 1/46 |
| 2024/0003245 | A1 | * | 1/2024 | Havre | E21B 43/00 |

* cited by examiner

*Primary Examiner* — Eric S. McCall
(74) *Attorney, Agent, or Firm* — Holland & Hart LLP

(57) ABSTRACT

A method of detecting a leak in a production or export system comprising a control system comprising at least one pressure transmitter is provided. The method includes detecting a flowing pressure of production fluid within the production or export system using the at least one pressure transmitter. The method also includes calculating an ambient pressure proximate to the at least one pressure transmitter. The method further includes determining an ambient zone above and below the ambient pressure proximate to the at least one pressure transmitter. The method also includes determining at least one ambient zone time, where the ambient zone time comprises a duration of time that the flowing pressure is within the ambient zone and the flowing pressure is proximate the ambient pressure. The method further includes determining a probability of a leaking in the production or export system based on the ambient zone time.

20 Claims, 3 Drawing Sheets

SYSTEMS AND METHODS FOR CONDITIONAL TIME NEAR AMBIENT MONITORING AND DETECTION OF LEAKS

TECHNICAL FIELD

The invention relates generally to systems and methods for leak detection and monitoring in subsea systems.

BACKGROUND OF CERTAIN ASPECTS OF THE DISCLOSURE

Subsea oil and gas production generally involves drilling and operating wells to locate and retrieve hydrocarbons. Subsea well sites are positioned in relatively deep water and produce oil and gas which is channeled to surface facilities for further processing in production risers, subsea pipelines, jumpers, manifolds, and/or trees. Subsea oil and gas production systems typically include a plurality of wells that are connected to at least one production riser or land-based landing by a plurality of subsea pipelines. The subsea pipeline may be flexible or rigid and transports produced oil, gas, water, and/or other production fluids to the production riser or land-based gathering terminal. The production riser may also be flexible or rigid and transports produced oil, gas, water, and/or other production fluids to a production facility.

The production riser may be substantially vertical or may have a variety of wave forms. However, the production riser will typically have substantially vertical portions regardless of the configuration of the production riser. Slug flow in the flowline or base of the production riser is characterized by the intermittent sequence of liquid slugs followed by longer gas bubbles flowing through the production riser. This flow pattern is frequently encountered in oil/gas production and transport lines because of liquid accumulation due to instantaneous imbalances between pressure and gravitational forces caused by production riser and subsea pipeline undulations and natural growth of hydrodynamic instabilities. Slug flow in production risers and subsea pipelines can cause large pressure changes in the production risers and subsea pipelines.

At least one known method of detecting leaks in subsea systems includes the Conditional Rate of Change (CROC) method of detecting leaks in subsea systems. Though CROC systems have shown a potential to be detect some leaks, CROC methodologies still have blind spots or shortcomings and require improvement or supplemental methods to provide more comprehensive coverage. Specifically, one of the main challenges affecting leak detection is the uniqueness of each subsea system. Operational decisions and flowing conditions can be dynamic, both day-to-day and over the life of the field. There may be fluctuations in the production's pressure, temperature, flow rate, composition, and fluid ratios. Over the life of a field, flowing pressure decreases and often reaches a point where it is very close to, or below, subsea ambient pressure.

Typically, CROC detects leaks by monitoring pressure and detecting rapid changes in pressure that would occur in a leak scenario. Monitoring thresholds and settings are adjusted as required when flowing conditions change, but there are limits to reliable monitoring with CROC. The CROC algorithm is unsuitable for fields that flow near ambient operating conditions due to the potential for false alarms in the narrow pressure range available to identify potential leaks. CROC leak detection under these conditions is especially difficult if slug flow is occurring because rapid pressure changes due to slug flow are hard to distinguish from the pressure changes that occur because of a leak because both scenarios can result in a relatively rapid change in pressure towards ambient conditions. Additionally, for systems that operate very near ambient pressure, the change in pressure if a leak were to occur would not be as dramatic and, therefore, very difficult to distinguish from normal operations.

As a result, there is a need for a leak detection system that supplements current leak detection technologies.

BRIEF SUMMARY OF SOME ASPECTS OF THE DISCLOSURE

One aspect of the present disclosure relates to a method of detecting a leak in a production or export system comprising a control system comprising at least one pressure transmitter configured to detect a flowing pressure of the production or export system. The method includes detecting a flowing pressure of production fluid within the production or export system using the at least one pressure transmitter. The method also includes calculating an ambient pressure proximate to the at least one pressure transmitter. The method further includes determining an ambient zone above and below the ambient pressure proximate to the at least one pressure transmitter. The method also includes determining at least one ambient zone time, where the ambient zone time comprises a duration of time that the flowing pressure is within the ambient zone and the flowing pressure is proximate the ambient pressure. The method further includes determining a probability of a leaking in the production or export system based on the ambient zone time.

Another aspect of the present disclosure relates to a control system of a production or export system, the control system comprising at least one pressure transmitter configured to detect a flowing pressure of the production or export system. The control system is configured to: detect a flowing pressure of production fluid within the production or export system using the at least one pressure transmitter; calculate an ambient pressure proximate to the at least one pressure transmitter; determine an ambient zone above and below the ambient pressure proximate to the at least one pressure transmitter; determine at least one ambient zone time, where the ambient zone time comprises a duration of time that the flowing pressure is within the ambient zone and the flowing pressure is proximate the ambient pressure; and determine a probability of a leaking in the production or export system based on the ambient zone time.

Yet another aspect of the present disclosure relates to a production or export system comprising a control system comprising at least one pressure transmitter configured to detect a flowing pressure of the production or export system. The production or export system is configured to: detect a flowing pressure of production fluid within the production or export system using the at least one pressure transmitter; calculate an ambient pressure proximate to the at least one pressure transmitter; determine an ambient zone above and below the ambient pressure proximate to the at least one pressure transmitter; determine at least one ambient zone time, where the ambient zone time comprises a duration of time that the flowing pressure is within the ambient zone and the flowing pressure is proximate the ambient pressure; and determine a probability of a leaking in the production or export system based on the ambient zone time.

There are other novel aspects and features of this disclosure. They will become apparent as this specification proceeds. Accordingly, this brief summary is provided to introduce a selection of concepts in a simplified form that are further described below in the detailed description. The summary and the background are not intended to identify key concepts or essential aspects of the disclosed subject matter, nor should they be used to constrict or limit the scope of the claims. For example, the scope of the claims should not be limited based on whether the recited subject matter includes any or all aspects noted in the summary and/or addresses any of the issues noted in the background.

BRIEF DESCRIPTION OF THE DRAWINGS

A further understanding of the nature and advantages of the embodiments may be realized by reference to the following drawings. In the appended figures, similar components or features may have the same reference label.

Figure 1:
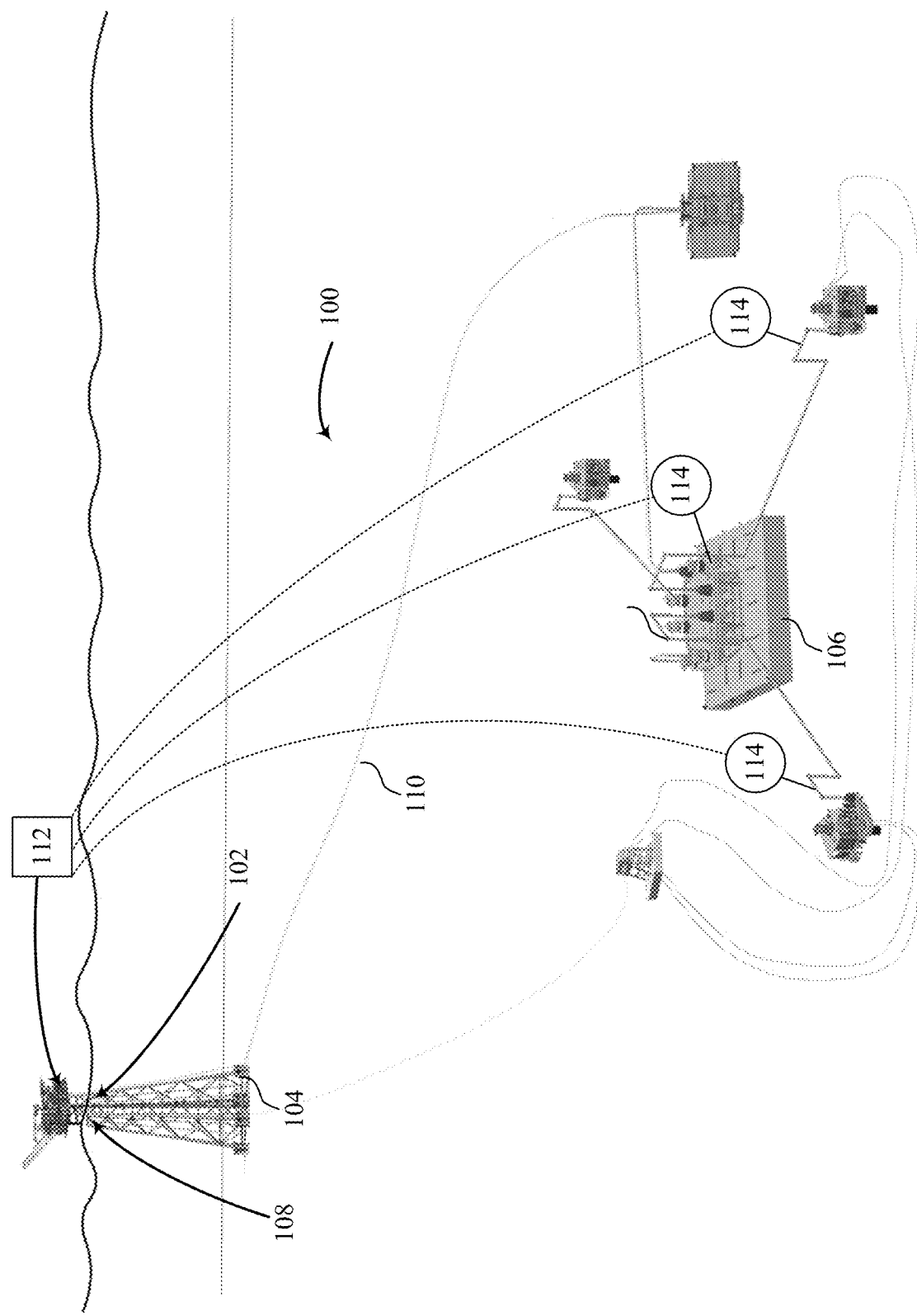
FIG. 1 is a block diagram of an exemplary subsea oil and gas production system in accordance with aspects of the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods disclosed herein relate to, among other things, leak detection in oil and gas production systems. Specifically, the systems and methods described herein relate to a system and method for conditional time near ambient pressure system for leak detection in oil and gas production systems and/or for supplementing existing leak detection systems. Existing leak detections systems are unsuitable for fields that flow near ambient operating conditions due to the potential for false alarms in the narrow pressure range available to identify potential leaks. Existing leak detections systems may be unreliable if slug flow is occurring because rapid pressure changes due to slug flow are hard to distinguish from the pressure changes that occur due to a leak because both scenarios can result in a relatively rapid change in pressure towards ambient conditions.

The conditional time near ambient pressure leak detection system described herein improves the accuracy of existing leak detection systems by monitoring the flowing pressure within the production riser and/or the subsea pipeline and the ambient pressure external to the production riser and/or the subsea pipeline, establishing an upper and lower limit pressure value for the flowing pressure relative to the ambient pressure, recording the frequency and duration that the flowing pressure is between the upper and lower limit pressures (flowing pressure is greater than the lower limit pressure but less than the upper limit pressure), and alerting the operator to a possible leak if the flowing pressure is between the upper and lower limit pressures beyond a maximum predetermined amount of time.

If a leak were to occur in the production riser and/or the subsea pipeline, the production fluid is leaking out of the production riser and/or the subsea pipeline and the pressure of the production fluid in the production riser and/or the subsea pipeline typically increases or decreases to the ambient pressure. That is, during a leak, the typical pressure signatures of slugging would significantly change or completely disappear, causing the pressure to smooth out near the ambient pressure. The systems and methods described herein detect the increased amount of time when the flowing pressure is between the upper and lower limit pressures and alerts the operator to a possible leak without relying on pressure spikes or changes. As such, the systems and methods described herein do not rely on changes in pressure and therefore reduce the scenarios where existing leak detection systems, such as CROC, are less likely to reliably detect a leak.

FIG. 1 illustrates a schematic illustration of an exemplary oil and gas production system 100. In the illustrated embodiment, the production system 100 is illustrated as a subsea oil and gas production system. In alternative embodiments, the production system 100 may also include export systems in addition to the subsea oil and gas production system illustrated in FIG. 1. The production system 100 includes a surface facility 102 connected via at least one production riser 104 to at least one subsea production system 106, including a plurality of wells, on the seabed. In the illustrated embodiment, the surface facility 102 is a fixed platform production facility. In alternative embodiments, the surface facility 102 may be substituted for any other suitable vessel at the water surface or land-based facility. In the illustrated embodiment, the production system 100 includes a single surface facility 102, a production riser 104, and a single subsea production system 106. In alternative embodiments, the production system 100 may include any number of surface facilities 102, production risers 104, and subsea production systems 106 that enable the production system 10 to operate as described herein, including a plurality of surface facilities 102, a plurality of production risers 104, and a plurality of subsea production systems 106. The production riser 104 includes a first end 108 attached to the surface facility 102 and a second end 110 attached to the subsea production system 106. The production riser 104 is typically more than a kilometer long with a substantial vertical rise, and, as such, production fluids channeled through the production riser 104 may be in a slug flow regime due to instantaneous imbalances between pressure and gravitational forces caused by production riser and subsea pipeline undulations and natural growth of hydrodynamic instabilities.

The production system 100 produces oil and gas by extracting oil and gas at the seabed and transporting the production fluids to a processing facility. The processing facility may be the surface facility 102, another surface facility, and/or an on-shore processing facility. Typically, the surface facility 102 monitors and controls the production fluids. Specifically, in the illustrated embodiment, the surface facility 102 includes a control system 112 that monitors and controls the production fluids. In the illustrated embodiment, the control system 112 includes at least one flowing pressure transmitter 116. The flowing pressure transmitter 116 measures the pressure of the production fluid at the pressure transmitter. Additionally, the control system 112 is configured to calculate an ambient pressure at the flowing pressure transmitter 116 based on the depth of the flowing pressure transmitter 116. The ambient pressure is the subsea hydrostatic pressure external to the production riser 104 at the flowing pressure transmitter 116. In alternative embodiments, the control system 112 may include an ambient pressure transmitter configured to measure the ambient pressure at the ambient pressure transmitter.

In the illustrated embodiment, the control system 112 generally includes a Subsea Production Control System (SPCS) configured to control the flow of production fluids from wells located on the seabed. The SPCS manages the flow of the production fluids such that they can be transferred safely to the surface to be processed. An SPCS generally includes supply and control equipment located at the surface facility 102 and equipment on the seabed (subsea) that acts upon the commands of the surface facility 102. The control system 112 may include Integrated Control and Safety Systems (ICSS), Distributed Control Systems (DCS), Master Control Stations (MCS), Programmable Logic Controllers (PLC), and/or any other control system or device.

In the illustrated embodiment, the flowing pressure transmitter 116 includes a pressure transmitter that is designed to withstand high pressures, corrosion, and water infiltration and may include ceramic piezo-resistive sensing elements. Typically, the flowing pressure transmitter 116 is most effective when it collects pressure data from a critical monitoring position subsea. As such, flowing pressure transmitter 116 may include Downstream Pressure and Temperature Transmitters, Manifold/Pipeline End Manifold Pressure and Temperature Transmitters, and/or Multiphase Flowmeter Pressure Transmitters and may be positioned in a manifold directly downstream of a wellhead or in a production riser base. The flowing pressure transmitter 116 is connected to the control system 112 by electric cables, wireless transmitters, and/or acoustic communications for instantaneous communication with the control system 112.

The control system 112 is configured to calculate the ambient pressure, or the subsea hydrostatic (seawater) pressure external to the production riser 104 at a pressure transmitter measurement location based on the depth of the flowing pressure transmitter 116. The flowing pressure transmitter 116 is configured to detect the flowing pressure, or the pressure of the production fluid at the designated subsea leak detection sensor location and report the flowing pressure to the control system 112.

Figure 2:
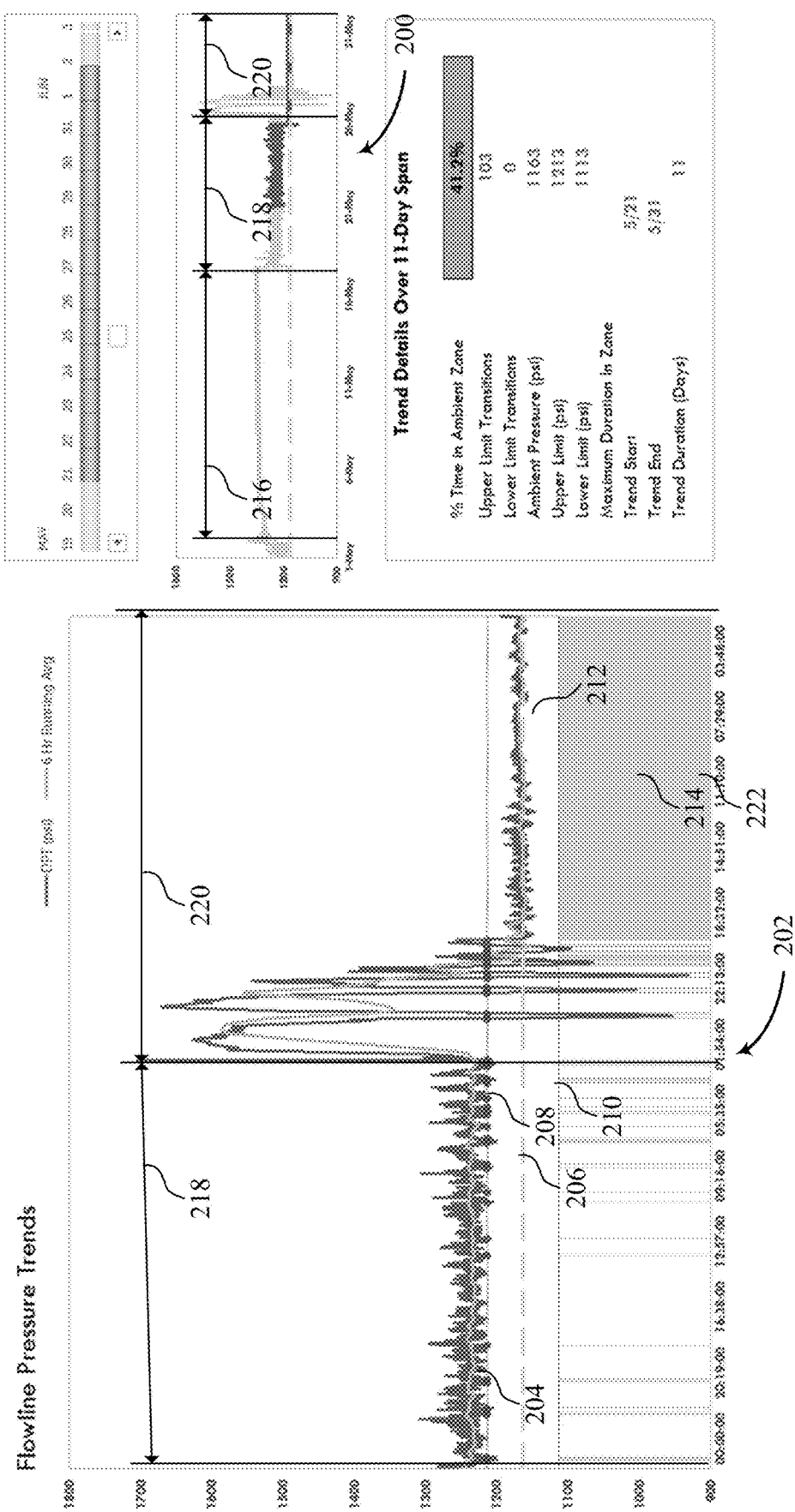
FIG. 2 illustrates a human machine interface display of the CTNA output in accordance with the aspects of the present disclosure.

FIG. 2 illustrates a human machine interface display of an output of the control system 112 for CTNA. As shown in FIG. 2, the output of the control system 112 includes a first graph 200 and a second graph 202 illustrating the flowing pressure(s) 204 within the subsea system 106 and the ambient pressure 206. More specifically, the Y-axis of the graphs 200 and 202 is the pressure, both the flowing pressure 204 and the ambient pressure 206, and the X-axis of the graphs 200 and 202 is time. The control system 112 receives instantaneous and continuous values of the flowing pressure 204 from the flowing pressure transmitter 116. The control system 112 then plots the flowing pressure 204 and the ambient pressure 206 over time in graphs 200 and 202.

The first graph 200 plots the flowing pressure(s) 204 within the subsea system 106 and the ambient pressure 206 over a long period of time and the second graph 202 is a subset of the first graph 200 and plots the flowing pressure(s) 204 within the subsea system 106 and the ambient pressure 206 over a shorter period of time than the first graph 200. The first graph 200 plots the flowing pressure(s) 204 during several flow regimes and illustrates the shortcomings of the CROC system. Specifically, the first graph 200 illustrates the flowing pressure(s) 204 within the subsea system 106 in a first flow regime 216, a second flow regime 218, and a third flow regime 220.

As shown in the first graph 200, the flow pressure(s) 204 in the first flow regime 216 are stable (consistently near the same pressure without pressure spikes or changes) and are at a pressure that is well above the ambient pressure 206. In the first flow regime 216, the CROC system operated in a predictable and consistent manner without initiating any false alarms that the system was leaking.

The operators then lowered the pressure within the subsea system 106 and the production fluids within the subsea system 106 began to slug within the second flow regime 218. As shown in the first graph 200 and as partially illustrated in the second graph 202, the flow pressure(s) 204 in the second flow regime 218 are unstable (frequent pressure spikes or changes) and are at a pressure that is closer to the ambient pressure 206 than the flow pressure(s) 204 in the first flow regime 216. In the second flow regime 218, the CROC system operated in an unpredictable and inconsistent manner by initiating false alarms that the system was leaking frequently. More specifically, in the illustrated embodiment, the CROC system initiated a false alarm that the system was leaking approximately every 30 seconds. This became a distraction for the operators such that the operator turned off the CROC system. The reason the CROC system had a difficult time operating effectively in the second flow regime 218 is because the CROC system detects pressure changes to detect leaks. More specifically, the CROC system detects extreme changes in pressure that reach certain thresholds, and then it has conditional logic to either block out that signal or not, depending on operator interaction with the system. However, because the production fluid is in a slugging flow regime, the pressure changes frequently and the CROC system frequently detects leaks.

The third flow regime 220, shown on the first and second graphs 200 and 202, illustrates the flow pressure(s) 204 when the subsea system 106 is leaking. The flow pressure(s) 204 are typically very close to the ambient pressure 206 and remain close to the ambient pressure 206 while the subsea system 106 is leaking. More specifically, as described below, the flow pressure(s) 204 remain in an ambient zone 212 for an extend period of time and may be relatively stable around the ambient pressure 206. This stability may cause the CROC system to not initiate an alarm because the system is not rapidly changing as described above. Thus, the CROC system may not detect a leak in the illustrated operational circumstances.

As illustrated in the second graph 202 of FIG. 2, the ambient pressure 206 remains substantially constant over time because the flowing pressure transmitter 116 does not typically move and the ambient pressure 206 is determined primarily by the hydrostatic pressure at the flowing pressure transmitter 116. In contrast, the flowing pressure 206 may rapidly change over relatively short periods of time because of slug flow in the production riser 104. Slug flow in the production riser 104 is characterized by the intermittent sequence of liquid slugs followed by longer gas bubbles flowing through the production riser 104. This flow pattern is frequently encountered in oil/gas production and transport lines because of liquid accumulation due to instantaneous imbalances between pressure and gravitational forces caused by the production riser 104 and subsea pipeline undulations and natural growth of hydrodynamic instabilities. Slug flow in the production riser 104 can cause large pressure changes in the production riser 104. These large pressure changes are illustrated in the flowing pressure 206 plotted on the graphs 200 and 202.

The control system 112 and/or an operator then sets an upper pressure limit 208 and a lower pressure limit 210. In some embodiments, the upper pressure limit 208 and the lower pressure limit 210 may be set automatically by the control system 112, and, in other embodiments, an operator may manually set the upper pressure limit 208 and the lower pressure limit 210. Setting the upper pressure limit 208 and the lower pressure limit 210 is dependent on a number of factors that are highly dependent on the specific system that the control system 112 is monitoring including, but not limited to, the typical range and volatility of the flowing pressure 204 fluctuations, the proximity of the expected flowing pressure 204 to the ambient pressure 206, the slugging behavior of the production fluid, and the trend period. In some embodiment, the control system 112 may use artificial intelligence to predict, learn, tag, and/or otherwise model pressure trends for future modeling.

In some embodiments, the upper pressure limit 208 and the lower pressure limit 210 may be a predetermined pressure above and below the ambient pressure 206. For example, the upper pressure limit 208 may be 5 pounds per square inch (psi), 10 psi, 15 psi, 20 psi, or more above the ambient pressure 206, and the lower pressure limit 210 may be 5 psi, 10 psi, 15 psi, 20 psi, or more below the ambient pressure 206. In some embodiments, the upper pressure limit 208 and the lower pressure limit 210 may be set by a mathematical formula. In alternative embodiments, the upper pressure limit 208 and the lower pressure limit 210 may be set by any method that enables the systems and methods described herein to operate as described herein.

The control system 112 defines an ambient zone 212 between the upper pressure limit 208 and the lower pressure limit 210. The ambient zone 212 is the pressures below the upper pressure limit 208 and above the lower pressure limit 210. As described above, the upper pressure limit 208 and the lower pressure limit 210 may be a set amount of pressure above and below the ambient pressure 206, and, as such, the total pressure defined by the ambient zone 212 may be 5 psi, 10 psi, 15 psi, 20 psi, or more around the ambient pressure 206. In alternative embodiments, the ambient zone 212 may be defined using any method that enables the systems and methods described herein to operate as described herein.

The control system 112 then tracks the amount of time that the flow pressure 204 is within the ambient zone 212 (an ambient zone time). Specifically, the dark vertical bars 214 extending from the lower pressure limit 210 to the X-axis illustrate a visual indication of the time the flow pressure 204 is within the ambient zone 212. If the flow pressure 204 is within the ambient zone 212 for an amount of time that is equal to or greater than a predetermined amount of time, the control system 112 alerts the operator that there may be a leak in the subsea system 106. The predetermined amount of time is dependent on a number of factors that are highly dependent on the specific system that the control system 112 is monitoring including, but not limited to, the typical range and volatility of the flowing pressure 204 fluctuations, the proximity of the expected flowing pressure 204 to the ambient pressure 206, the slugging behavior of the production fluid, and the trend period. In some embodiments, the predetermined amount of time may be 30 minutes, an hour, 2 hours, and/or more than 2 hours.

Specifically, as shown in the second graph 202, the flow pressure(s) 204 are continuously in the ambient zone 212 in the third flow regime 220. This results in a long dark vertical bar 222 that indicates that the flow pressure(s) 204 are within the ambient zone 212 for an extended period of time. In the illustrated embodiment, the flow pressure(s) 204 are within the ambient zone 212 for longer than the predetermined amount of time and the control system 112 initiates an alarm to the operators that the subsea system 106 may be leaking. The control system 112 may be configured to determine a probability of a leak in the system 100 based on the ambient zone time or based on at least one of the statics based on the ambient zone time described below.

The control systems 112 described herein is able to detect leaks in operating conditions that are unfavorable to the CROC system. Specifically, the control system 112 described herein operates in a different manner than the CROC system because it does not analyze pressure changes or spikes. Rather, the control systems 112 described herein analyze how long the flow pressure(s) 204 are in close proximity to the ambient pressure 206 and alerts the operator if the flow pressure(s) 204 are too close proximity to the ambient pressure 206 for too long. This is a fundamentally different analysis than the CROC system and the control systems 112 described herein may be used to supplement the CROC system or may be used instead of the CROC system.

Additionally, the control systems 112 described herein may be used in conjunction with other leak detection methods to provide a robust leak detection system with several detection methods that provide a check on each of the other methods. For example, the control systems 112 described herein may be used with the CROC system, a mass-in, mass-out system, a temperature-based leak detection system, and/or any other system.

Furthermore, the control systems 112 described herein provide continuous, automatic, and instantaneous tracking and analysis of the flow pressure(s) 204 in real time to determine if the subsea system 106 may be leaking. Specifically, operators of production systems 100 have to attend to and monitor many operating parameters of the systems and it is completely impractical for an operator to continuously track and monitor the flow pressure(s) 204 of the system and calculate the proximity of the flow pressure(s) 204 relative to the ambient pressure 206 on a continuous basis. Accordingly, the control systems 112 described herein provide continuous and automatic leak detection so that the operators can attend to the operations of the system.

The embodiments illustrated herein include a single control system 112. However, as illustrated in FIG. 1, the control system 112 may be connected to a plurality of flowing pressure transmitters 114 and, as such, may include a plurality of CTNA systems simultaneously monitoring the entire system 100. When a system 100 with a plurality of CTNA systems leaks, the flow pressure(s) 204 of each CTNA system will enter the ambient zone 212 sequentially depending on the proximity of the CTNA system to the leak such that the flow pressure(s) 204 of each CTNA system will enter the ambient zone 212 one at a time. Thus, when the flow pressure(s) 204 of a first CTNA system enters the ambient zone 212 followed by the flow pressure(s) 204 of a second CTNA system, the operator is able to quickly ascertain that the system 106 may be leaking and may be able to locate the leak based on the order in which the flow pressure(s) 204 of each CTNA system entered the ambient zone 212.

Additionally, the control system 112 may track various statistics related to the flow pressure(s) 204 and the control system 112 may alert the operators to a leak based on analysis of tracked statistics. For example, the control system 112 may also track the total amount of time that the flow pressure 204 is within the ambient zone 212. Specifically, the control system 112 may add the amount of time represented by the dark vertical bars 214. If the flow pressure 204 is within the ambient zone 212 for a total amount of time that is equal to or greater than a predetermined total amount of time, the control system 112 alerts the operator that there may be a leak in the subsea system 106. The total predetermined amount of time is dependent on a number of factors that are highly dependent on the specific system that the control system 112 is monitoring including, but not limited to, the typical range and volatility of the flowing pressure 204 fluctuations, the proximity of the expected flowing pressure 204 to the ambient pressure 206, the slugging behavior of the production fluid, and the trend period. The total amount of time and the predetermined total amount of time may be expressed as a percentage of total time.

The control system 112 may be further configured to calculate a total amount of time in the ambient zone 212 that measures the cumulative time that the process pressure remains within the ambient zone 212. It is a continuous record that updates as the process operates within the specified parameters. The control system 112 may also be configured to calculate a total amount of time out of the ambient zone 212 that tracks the total time that the process pressure deviates from the ambient zone 212, providing insights into the frequency and extent of these occurrences. The control system 112 may be further configured to calculate an average amount of time in the ambient zone 212 that calculates the average length of time that the process pressure stays within the ambient zone 212, assessing the stability of the process over time. The control system 112 may be further configured to calculate an average amount of time out of the ambient zone 212 that calculates an average measure of the time intervals when the process pressure is outside the ambient zone 212 over a selectable timeframe. The control system 112 may also be configured to count the number of times the process pressure transitions between in-ambient zone and out-of-ambient zone states within an adjustable period to provide the operator with an understanding of the process's variability and the effectiveness of control measures. Finally, the control system 112 may be configured to determine whether to issue an alarm or warning to the operator based on the various statics described herein and an analysis of the frequency and duration of out-of-ambient zone occurrences and the number of transitions, ensuring timely alerts for any process anomalies.

In alternative embodiments, the control system 112 may calculate a running average of the flow pressure 204 over a specified period of time. Furthermore, in some embodiments, the control system 112 may be configured to analyze the peaks and valleys of the flow pressure 204 to determine if the flow pressure 204 is peaking or dipping to approximately the same pressure all the time, indicating a leak. If the pressure peaks always stop at a certain point, it would indicate an external leak that occurs when pressure rises above the ambient pressure. The opposite would be true for valleys stopping, indicating a leak into the production riser 104 at this point. A leak may also cause a dampening of the peaks and valleys in both directions and ultimately produce a trend of up and down fluctuations that float at the ambient pressure 206.

Typically, CROC detects leaks by monitoring pressure and detecting rapid changes in pressure that would likely occur in a leak scenario. Monitoring thresholds and settings are adjusted as required when flowing conditions change, but there are limits to reliable monitoring with CROC. The CROC algorithm is unsuitable for fields that flow near ambient operating conditions due to the potential for false alarms in the narrow pressure range available to identify potential leaks. CROC leak detection under these conditions is especially difficult if slug flow is occurring because rapid pressure changes due to slug flow are hard to distinguish from the pressure changes that occur because of a leak because both scenarios can result in a relatively rapid change in pressure towards ambient conditions. Additionally, for systems that operate very near ambient pressure, the change in pressure if a leak were to occur would not be as dramatic and, therefore, very difficult to distinguish from normal operations.

The systems and methods described herein reduce nuisance alarms because the systems and methods described herein do not rely on detecting rapid pressure changes to detect leaks. Rather, the systems and methods described herein are configured to detect leaks during slug flow when rapid pressure changes are frequent and may cause false alarms. Specifically, if a leak were to occur in the production riser 104, the production fluid would be leaking out of the production riser 104 and the pressure of the production fluid in the production riser 104 typically increases or decreases to the ambient pressure. That is, during a leak, the typical pressure signatures of slugging would significantly change or completely disappear, causing the pressure to smooth out near the ambient pressure 206. The systems and methods described herein detect the increased amount of time when the flowing pressure 204 is between the upper and lower limit pressures and alerts the operator to a possible leak without relying on pressure spikes. As such, the systems and methods described herein reduce the scenarios where existing leak detection systems are less likely to detect a leak.

Figure 3:
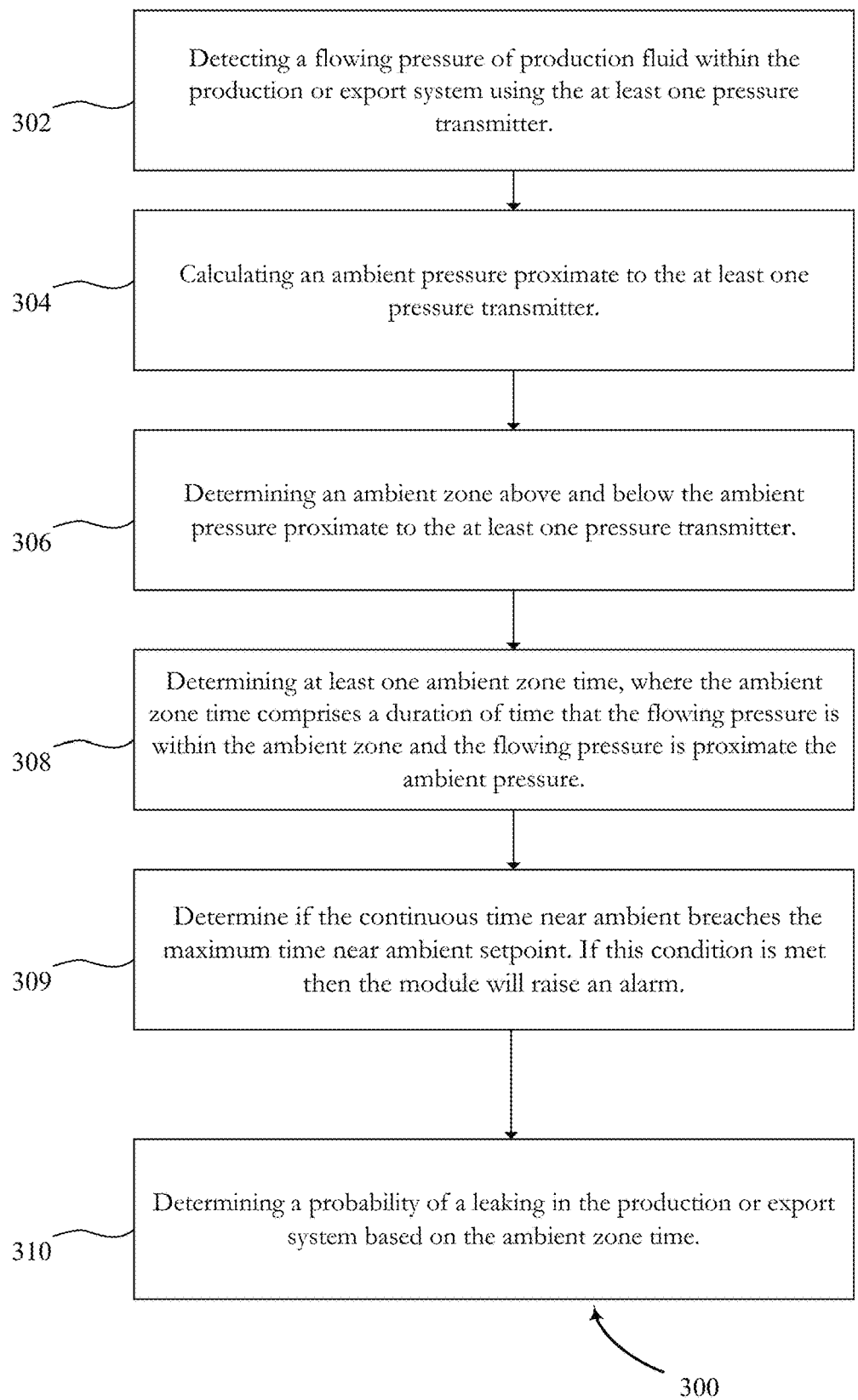
FIG. 3 illustrates a flow diagram of a method of detecting a leak in a subsea system in accordance with aspects of the present disclosure.

FIG. 3 illustrates a flow diagram of a method 300 of detecting a leak in a production or export system comprising a control system comprising at least one pressure transmitter configured to detect a flowing pressure of the production or export system. The method 300 includes detecting 302 a flowing pressure of production fluid within the production or export system using the at least one pressure transmitter. The method 300 also includes calculating 304 an ambient pressure proximate to the at least one pressure transmitter. The method 300 further includes determining 306 an ambient zone above and below the ambient pressure proximate to the at least one pressure transmitter. The method 300 also includes determining 308 at least one ambient zone time, where the ambient zone time comprises a duration of time that the flowing pressure is within the ambient zone and the flowing pressure is proximate the ambient pressure. The method 300 further includes determining 310 a probability of a leaking in the production or export system based on the ambient zone time.

It should be noted that the methods described herein describe possible implementations, and that the operations and the steps may be rearranged or otherwise modified and that other implementations are possible. Furthermore, aspects from two or more of the methods may be combined.

If wireless communications are used, the techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 805.11 (Wi-Fi), IEEE 805.16 (WiMAX), IEEE 805.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein may include one or more carriers.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical venues. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

Terminology and Interpretative Conventions

Any methods described in the claims or specification should not be interpreted to require the steps to be performed in a specific order unless stated otherwise. Also, the methods should be interpreted to provide support to perform the recited steps in any order unless stated otherwise.

Spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The terms have, having, include, and including should be interpreted to be synonymous with the terms comprise and comprising. The use of these terms should also be understood as disclosing and providing support for narrower alternative embodiments where these terms are replaced by "consisting" or "consisting essentially of."

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any embodiment, feature, or combination of features described or illustrated in this document. This is true even if only a single embodiment of the feature or combination of features is illustrated and described in this document.

What is claimed:

1. A method of detecting a leak in a production or export system comprising a control system comprising at least one pressure transmitter configured to detect a flowing pressure of the production or export system, the method comprising:
    detecting a flowing pressure of production fluid within the production or export system using the at least one pressure transmitter;
    calculating an ambient pressure proximate to the at least one pressure transmitter;
    determining an ambient zone above and below the ambient pressure proximate to the at least one pressure transmitter;
    determining at least one ambient zone time, wherein the ambient zone time comprises a duration of time that the flowing pressure is within the ambient zone and the flowing pressure is proximate the ambient pressure; and
    determining a probability of a leaking in the production or export system based on the ambient zone time.

2. The method of claim 1, wherein determining a probability of a leaking in the production or export system based on the ambient zone time comprises comparing the ambient zone time to a predetermined amount of time.

3. The method of claim 2, further comprising alerting an operator if the ambient zone time exceeds the predetermined amount of time.

4. The method of claim 1, wherein determining at least one ambient zone time comprises determining a plurality of ambient zone times, and wherein the method further comprises determining a total amount of time the flowing pressure is within the ambient zone by adding the plurality of ambient zone times.

5. The method of claim 4, wherein determining a probability of a leaking in the production or export system based on the ambient zone time comprises determining a probability of a leaking in the production or export system based on the total amount of time the flowing pressure is within the ambient zone.

6. The method of claim 1, wherein determining at least one ambient zone time comprises determining a plurality of ambient zone times, and wherein the method further comprises determining an average amount of time the flowing pressure is within the ambient zone by averaging the plurality of ambient zone times.

7. The method of claim 6, wherein determining a probability of a leaking in the production or export system based on the ambient zone time comprises determining a probability of a leaking in the production or export system based on the average amount of time the flowing pressure is within the ambient zone.

8. The method of claim 6, further comprising determining a running average of the average amount of time the flowing pressure is within the ambient zone based on the average amount of time the flowing pressure is within the ambient zone: and
determining a probability of a leaking in the production or export system based on the average amount of time the flowing pressure is within the ambient zone.

9. The method of claim 1, further comprising determining a total amount of time the flowing pressure is outside the ambient zone.

10. The method of claim 9, wherein determining a probability of a leaking in the production or export system based on the ambient zone time comprises determining a probability of a leaking in the production or export system based on the total amount of time the flowing pressure is outside the ambient zone.

11. The method of claim 9, further comprising determining an average amount of time the flowing pressure is outside the ambient zone based on the total amount of time the flowing pressure is outside the ambient zone; and
determining a probability of a leaking in the production or export system based on the average amount of time the flowing pressure is outside the ambient zone.

12. The method of claim 1, further comprising determining a number of ambient zone transitions by counting a number of times the flowing pressure transitions into or out of the ambient zone.

13. The method of claim 12, wherein determining a probability of a leaking in the production or export system based on the ambient zone time comprises determining a probability of a leaking in the production or export system based on the number of ambient zone transitions.

14. The method of claim 1, further comprising determining a running average of the flowing pressure; and
determining a probability of a leaking in the production or export system based on the average of the flowing pressure.

15. The method of claim 1, further comprising:
determining a plurality of extremum of the flowing pressure;
determining if the plurality of extremum of the flowing pressure are approximately equal to each other; and
determining a probability of a leaking in the production or export system based whether the plurality of extremum of the flowing pressure are approximately equal to each other.

16. A control system of a production or export system, the control system comprising at least one pressure transmitter configured to detect a flowing pressure of the production or export system, the control system configured to:
detect a flowing pressure of production fluid within the production or export system using the at least one pressure transmitter;
calculate an ambient pressure proximate to the at least one pressure transmitter;
determine an ambient zone above and below the ambient pressure proximate to the at least one pressure transmitter;
determine at least one ambient zone time, wherein the ambient zone time comprises a duration of time that the flowing pressure is within the ambient zone and the flowing pressure is proximate the ambient pressure; and
determine a probability of a leaking in the production or export system based on the ambient zone time.

17. The control system of claim 16, wherein determining a probability of a leaking in the production or export system based on the ambient zone time comprises comparing the ambient zone time to a predetermined amount of time.

18. The control system of claim 17, further comprising alerting an operator if the ambient zone time exceeds the predetermined amount of time.

19. A production or export system comprising a control system comprising at least one pressure transmitter configured to detect a flowing pressure of the production or export system, the production or export system configured to:
detect a flowing pressure of production fluid within the production or export system using the at least one pressure transmitter;
calculate an ambient pressure proximate to the at least one pressure transmitter;
determine an ambient zone above and below the ambient pressure proximate to the at least one pressure transmitter;
determine at least one ambient zone time, wherein the ambient zone time comprises a duration of time that the flowing pressure is within the ambient zone and the flowing pressure is proximate the ambient pressure; and
determine a probability of a leaking in the production or export system based on the ambient zone time.

20. The production or export system of claim 19, wherein determining a probability of a leaking in the production or export system based on the ambient zone time comprises comparing the ambient zone time to a predetermined amount of time.

* * * * *